US011557863B2

(12) United States Patent
Chen

(10) Patent No.: US 11,557,863 B2
(45) Date of Patent: Jan. 17, 2023

(54) ELECTRICAL CONNECTION DEVICE

(71) Applicant: MOLEX, LLC, Lisle, IL (US)

(72) Inventor: Wei-Yu Chen, New Taipei (TW)

(73) Assignee: Molex, LLC, Lisle, IL (US)

(*) Notice: Subject to any disclaimer, the term of this patent is extended or adjusted under 35 U.S.C. 154(b) by 300 days.

(21) Appl. No.: 17/031,900

(22) Filed: Sep. 25, 2020

(65) Prior Publication Data
US 2021/0096301 A1    Apr. 1, 2021

(30) Foreign Application Priority Data

Sep. 27, 2019   (CN) .......................... 201910922756.4

(51) Int. Cl.
*H01R 13/717*   (2006.01)
*H01R 13/6582*  (2011.01)
*G02B 6/36*     (2006.01)

(52) U.S. Cl.
CPC ..... *H01R 13/7172* (2013.01); *H01R 13/6582* (2013.01); *G02B 6/3616* (2013.01)

(58) Field of Classification Search
CPC . H01R 13/7172; G02B 6/4256; G02B 6/4277
See application file for complete search history.

(56) References Cited

U.S. PATENT DOCUMENTS

| 9,933,555 | B2 | 4/2018 | Henry et al. | |
| 10,826,251 | B2* | 11/2020 | Liu | ............... H01R 13/7172 |
| 2012/0155108 | A1* | 6/2012 | Scholeno | ............ G02B 6/4298 |
| | | | | 362/580 |
| 2012/0264330 | A1* | 10/2012 | Banakis | ............. H01R 13/6585 |
| | | | | 439/569 |
| 2017/0214170 | A1* | 7/2017 | Su | ........................ G02B 6/4284 |
| 2019/0296493 | A1* | 9/2019 | Liu | ...................... G02B 6/0001 |

FOREIGN PATENT DOCUMENTS

| CN | 201117945 Y | | 9/2008 |
| CN | 107196151 A | | 9/2017 |
| TW | M514183 U | | 12/2015 |
| TW | M522482 U | | 5/2016 |
| TW | I559624 B | | 11/2016 |
| TW | 202114303 A | * | 4/2021 |
| TW | I 771084 B | * | 7/2022 |

OTHER PUBLICATIONS

Office action received for Chinese patent application No. 201910922756.4, dated Jan. 18, 2022, 18 pages (10 pages of English translation and 8 pages of Official copy).

* cited by examiner

*Primary Examiner* — Michael Stahl

(57) ABSTRACT

The present disclosure provides an electrical connection device that includes a shell, a holding member and a light guiding member. The shell has a front end insertion opening and a rear wall. The rear wall is formed with a first clip structure, and the first clip structure has a sheet body which is integrally formed rearwardly by the rear wall. A clip hole is defined between the sheet body and the rear wall. The holding member has a holding body and a second clip structure which is integrally formed from the holding body and correspondingly cooperates with the first clip structure. The second clip structure has a first arm which is inserted into to the clip hole with an interference fit. A plurality of light guiding pipes are inserted into to the holding body of the holding member.

18 Claims, 8 Drawing Sheets

ELECTRICAL CONNECTION DEVICE

RELATED APPLICATIONS

The application claims priority to Chinese Patent Application No. 201910922756.4 filed Sep. 27, 2019 which is incorporated by reference in its entirety.

TECHNICAL FIELD

The present disclosure relates to an electrical connection device, particularly relates to an electrical connection device having a light guiding member.

BACKGROUND

Chinese invention patent application publication No. CN107196151A (corresponding to U.S. Pat. No. 9,933,555B2) discloses a receptacle assembly, a circuit board support of the receptacle assembly includes a mounting feature, the mounting feature is configured to engage with a receptacle shell so as to fix a light pipe to the receptacle shell. The mounting feature may be clip or latch. The receptacle shell includes an opening in a rear wall sized and shaped to receive the mounting feature. The circuit board support may be fixed to the rear wall by mounting the mounting feature via the opening, and the mounting feature may clip the rear wall to fix the circuit board support at the receptacle shell. A bottom of the circuit board support may be generally aligned with a bottom of the receptacle shell such that the bottom of the circuit board support may rest on the circuit board. However, the presence of the opening in the rear wall will result in leakage of Electromagnetic Interference (EMI) from the opening. And, when a size of the mounting feature is smaller than a distance from a bottom edge of the opening to a bottom edge of the rear wall due to tolerance, the mounting feature cannot latch to the rear wall, but when the size of the mounting feature is larger than the distance from the bottom edge of the opening to the bottom edge of the rear wall due to tolerance, latching between the mounting feature and the rear wall is easily loosened.

SUMMARY

Therefore, an object of the present disclosure is to provide an electrical connection device which can improve at least one deficiency in the prior art.

Accordingly, in some embodiments, an electrical connection device comprises a shell, a holding member and a light guiding member. The shell has a front end insertion opening and a rear wall, the rear wall is formed with a first clip structure, the first clip structure has a sheet body which is integrally formed rearwardly by the rear wall, a clip hole is defined between the sheet body and the rear wall. The holding member has a holding body and a second clip structure which is integrally formed from the holding body and correspondingly cooperates with the first clip structure, the second clip structure has a first arm which is inserted into to the clip hole with an interference fit. The light guiding member has a plurality of light guiding pipes, each light guiding pipe has a light entering end and a light exiting end, the light entering ends of the plurality of the light guiding pipes being inserted into to the holding body of the holding member.

In some embodiments, the first arm is formed with at least one protruding rib which abuts against the sheet body or the rear wall with an interference fit.

In some embodiments, the second clip structure further has a second arm which clips the sheet body together with the first arm.

In some embodiments, the second arm has a stopping portion which is used to abut against an edge of the sheet body.

In some embodiments, the first arm has a planar surface which faces the rear wall, the planar surface is attach to an outer surface of the rear wall.

In some embodiments, the light guiding member has a plurality of connecting posts which are connected between the plurality of the light guiding pipes and a fixed post which is positioned to a center of one of the plurality of connecting posts positioned at the light entering ends of the plurality of the light guiding pipes and extends forwardly, the holding body is formed with a recessed groove which is opened at a top of the holding body and correspondingly receives the fixed post.

In some embodiments, the holding member further has two latching arms which limit the fixed post in position, each latching arm has a latching protrusion which is used to latch the fixed post.

In some embodiments, the sheet body is formed by rearwardly stamping the rear wall.

In some embodiments, the shell further has a grounding member provided at the front end insertion opening, the grounding member has a plurality of elastic fingers which rearwardly extend from a position at the front end insertion opening, a receiving recessed portion is rearwardly formed at the front end insertion opening of the shell and correspondingly receives a front end of the grounding member.

Accordingly, in some embodiments, an electrical connection device comprises a shell, a holding member and a light guiding member. The shell has a front end insertion opening and a rear wall, the rear wall is formed with a first clip structure, the first clip structure has a sheet body which is integrally formed rearwardly by the rear wall, a clip hole is defined between the sheet body and the rear wall. The holding member has a holding body and a second clip structure which is integrally formed from the holding body and correspondingly cooperates with the first clip structure, the second clip structure has a first arm which is inserted into to the clip hole and a second arm which clips the sheet body together with the first arm. The light guiding member has a plurality of light guiding pipes, each light guiding pipe has a light entering end and a light exiting end, the light entering ends of the plurality of the light guiding pipes being inserted into to the holding body of the holding member.

In some embodiments, the second arm has a stopping portion which is used to abut against an edge of the sheet body.

In some embodiments, the first arm abuts against the sheet body and the rear wall, which define the clip hole, with an interference fit.

In some embodiments, the first arm is formed with at least one protruding rib which abuts against the sheet body or the rear wall with an interference fit.

In some embodiments, the first arm has a planar surface which faces the rear wall, the planar surface is attach to an outer surface of the rear wall.

In some embodiments, the light guiding member has a plurality of connecting posts which are connected between the plurality of the light guiding pipes and a fixed post which is positioned to a center of one of the plurality of connecting posts positioned at the light entering ends of the plurality of the light guiding pipes and extends forwardly, the holding body is formed with a recessed groove which is opened at a top of the holding body and correspondingly receives the fixed post.

In some embodiments, the holding member further has two latching arms which limit the fixed post in position, each latching arm has a latching protrusion which is used to latch the fixed post.

In some embodiments, the sheet body is formed by rearwardly stamping the rear wall.

In some embodiments, the shell further has a grounding member provided at the front end insertion opening, the grounding member has a plurality of elastic fingers which rearwardly extend from a position at the front end insertion opening, a receiving recessed portion is rearwardly formed at the front end insertion opening of the shell and correspondingly receives a front end of the grounding member.

In the present disclosure, the first clip structure has the sheet body which is integrally formed rearwardly by the rear wall, by that the sheet body and the second clip structure can correspondingly cooperate with each other, the holding member is easily mounted to the rear wall of the shell, and because the sheet body is formed by stamping rearwardly the rear wall, the sheet body can partially cover the opened area which is positioned at the first clip structure of the rear wall and directly faces the receiving cavity of the shell, in turn leakage of Electromagnetic Interference (EMI) is decreased.

BRIEF DESCRIPTION OF THE DRAWINGS

Other features and technical effects of the present disclosure will be apparent in embodiments referring to the accompanying figures, in which.

DETAILED DESCRIPTION OF THE PREFERRED EMBODIMENTS

Figure 1:
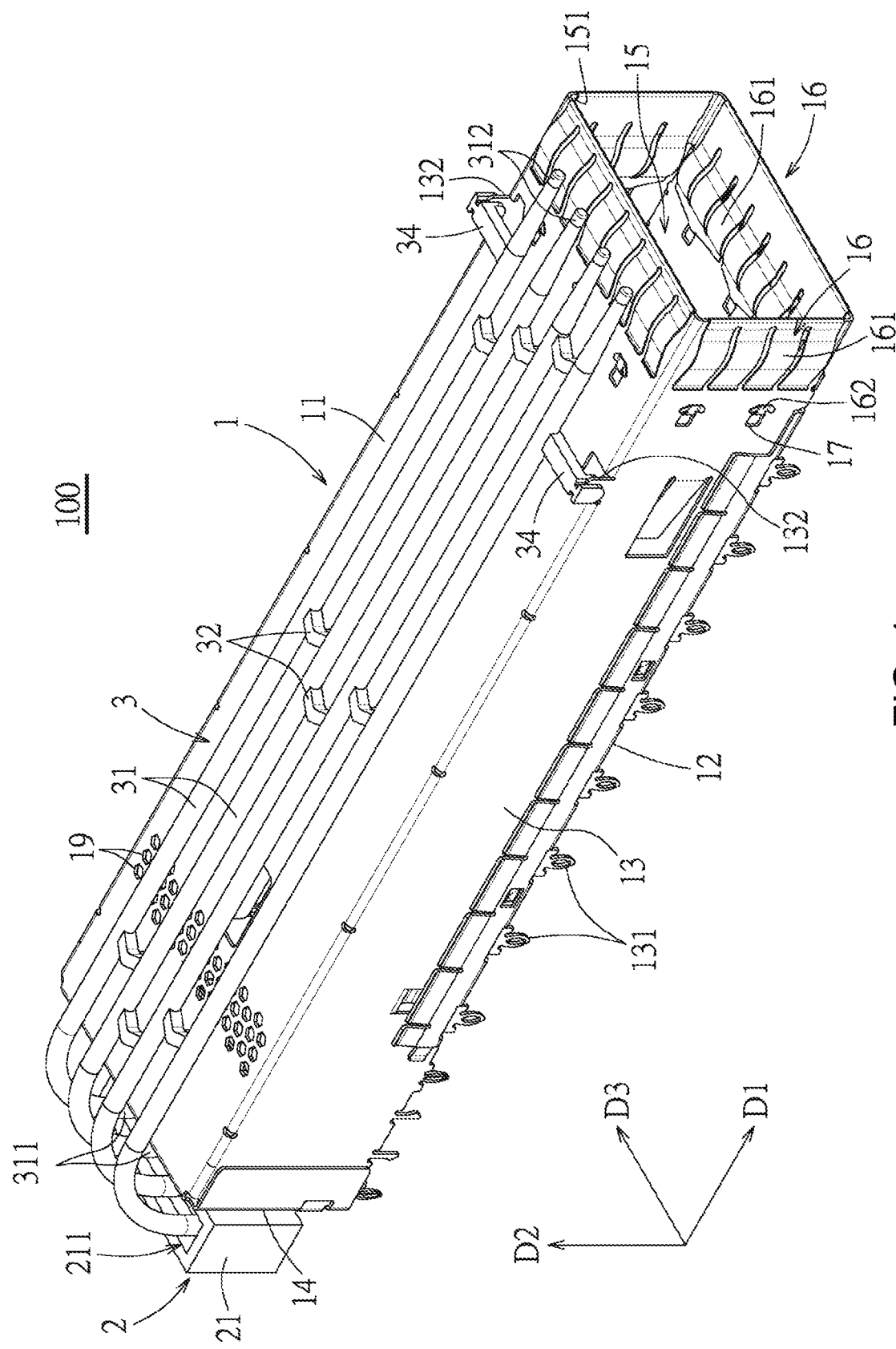
FIG. 1 is a perspective view of an embodiment of an electrical connection device of the present disclosure.
Figure 2:
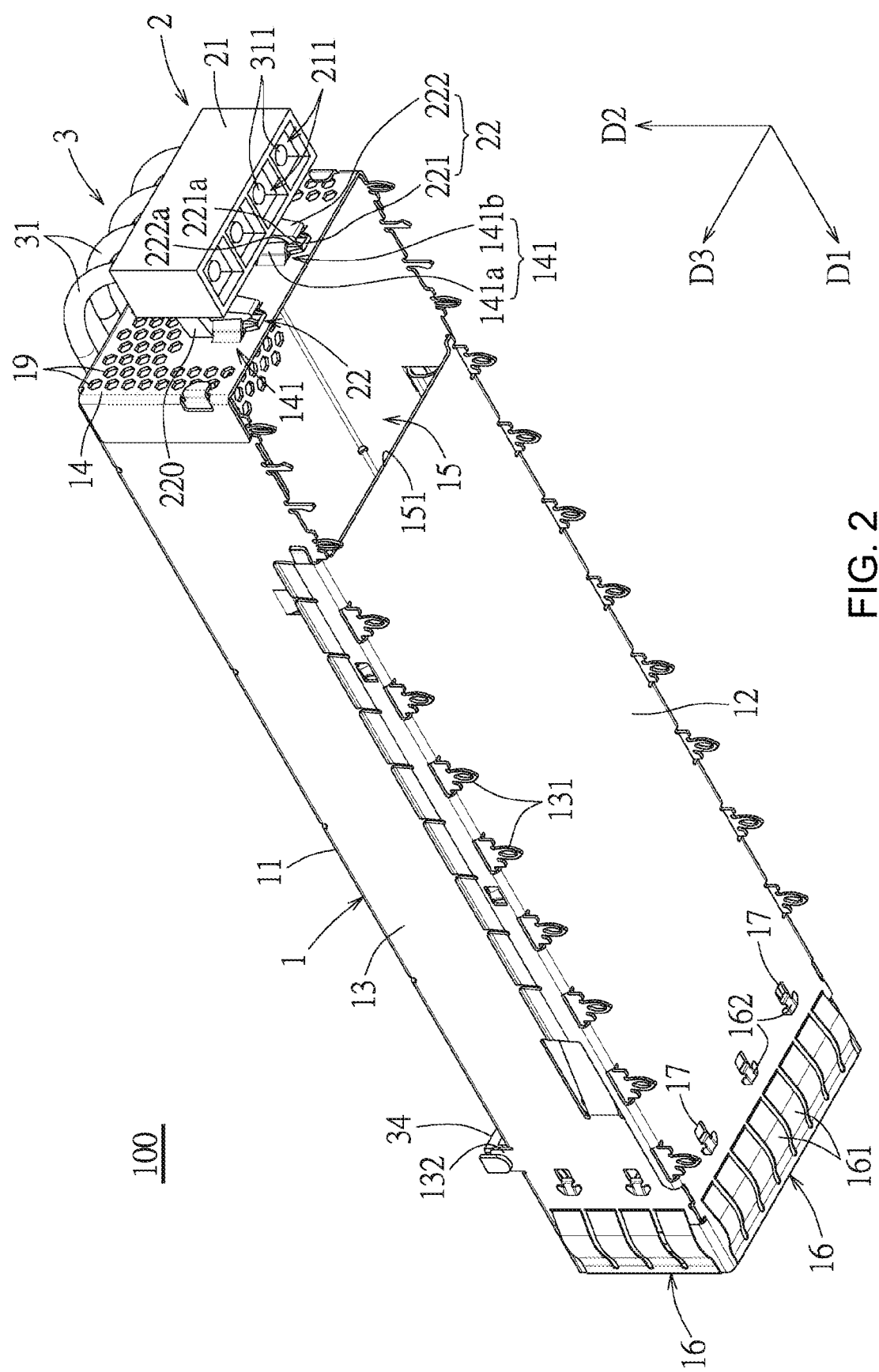
FIG. 2 is a perspective view of the embodiment viewed from another angle.
Figure 3:
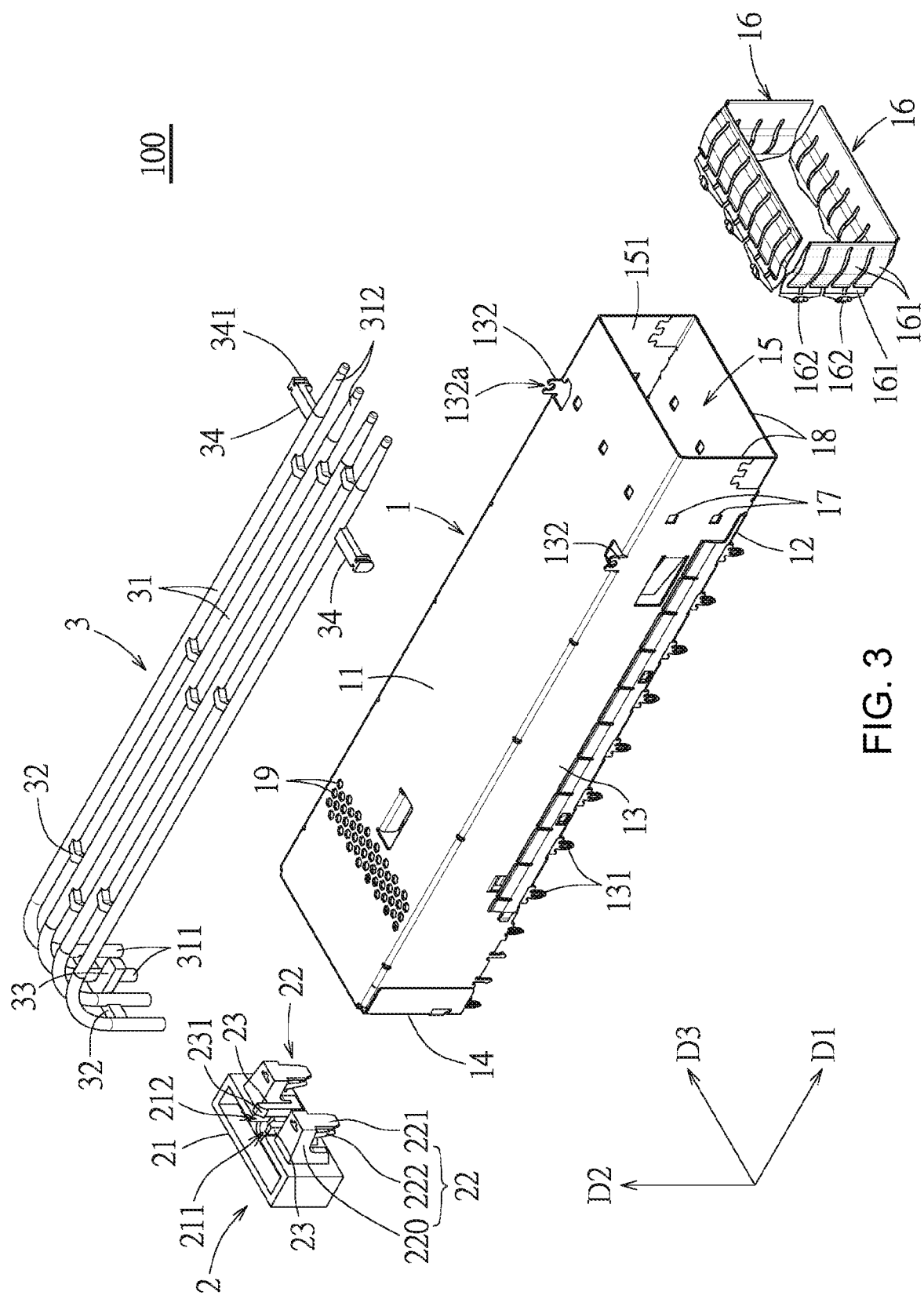
FIG. 3 is a perspective exploded view of FIG. 1.
Figure 4:
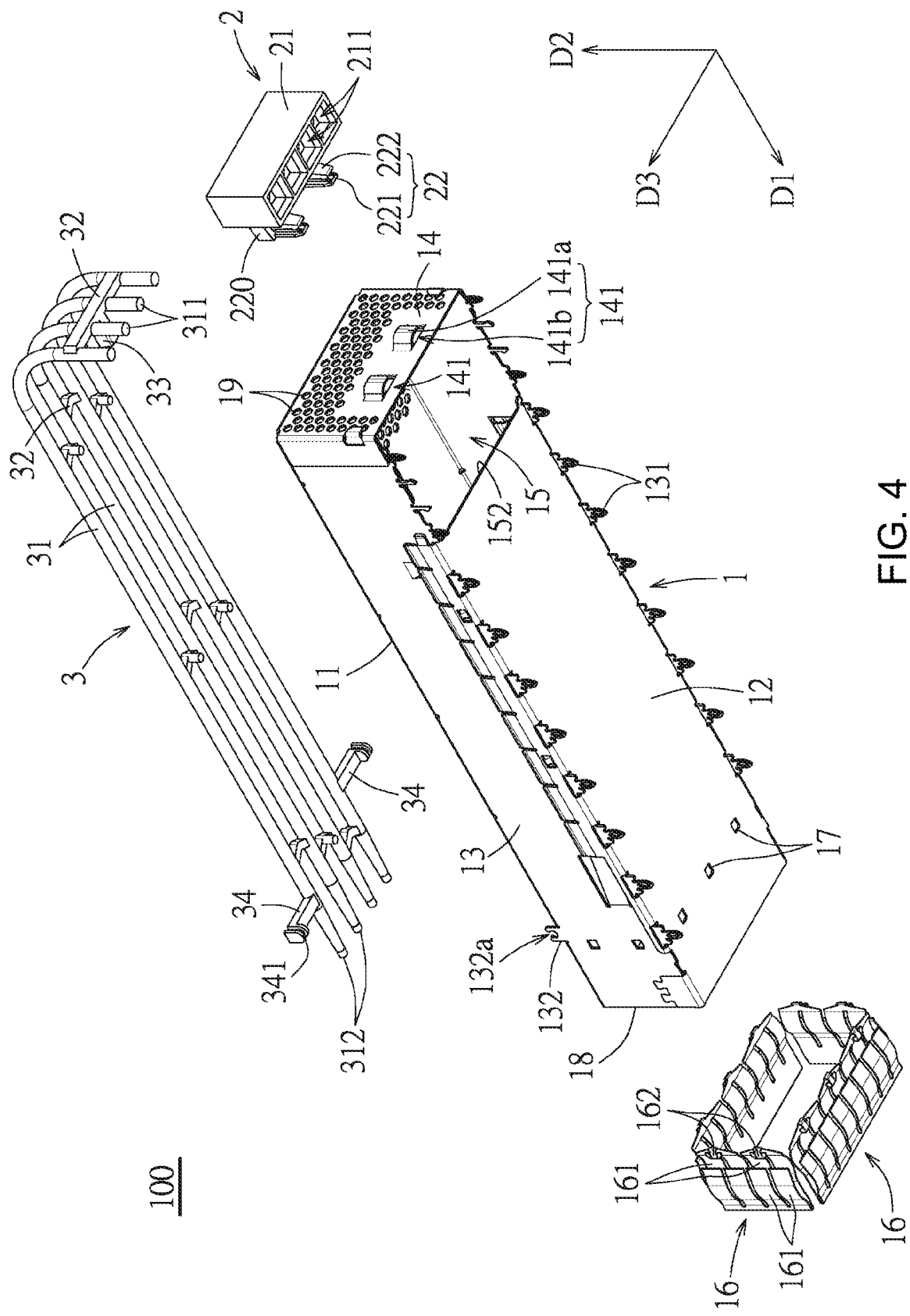
FIG. 4 is a perspective exploded view of FIG. 3 viewed from another angle.

Before the present disclosure is described in detail, it should be noted that like elements are denoted by the same reference numerals in the following description.

Referring to FIG. 1 to FIG. 4, an embodiment of an electrical connection device 100 of the present disclosure is adapted to mate with a mating device (not shown), the electrical connection device 100 includes a shell 1, a holding member 2 and a light guiding member 3.

Figure 5:
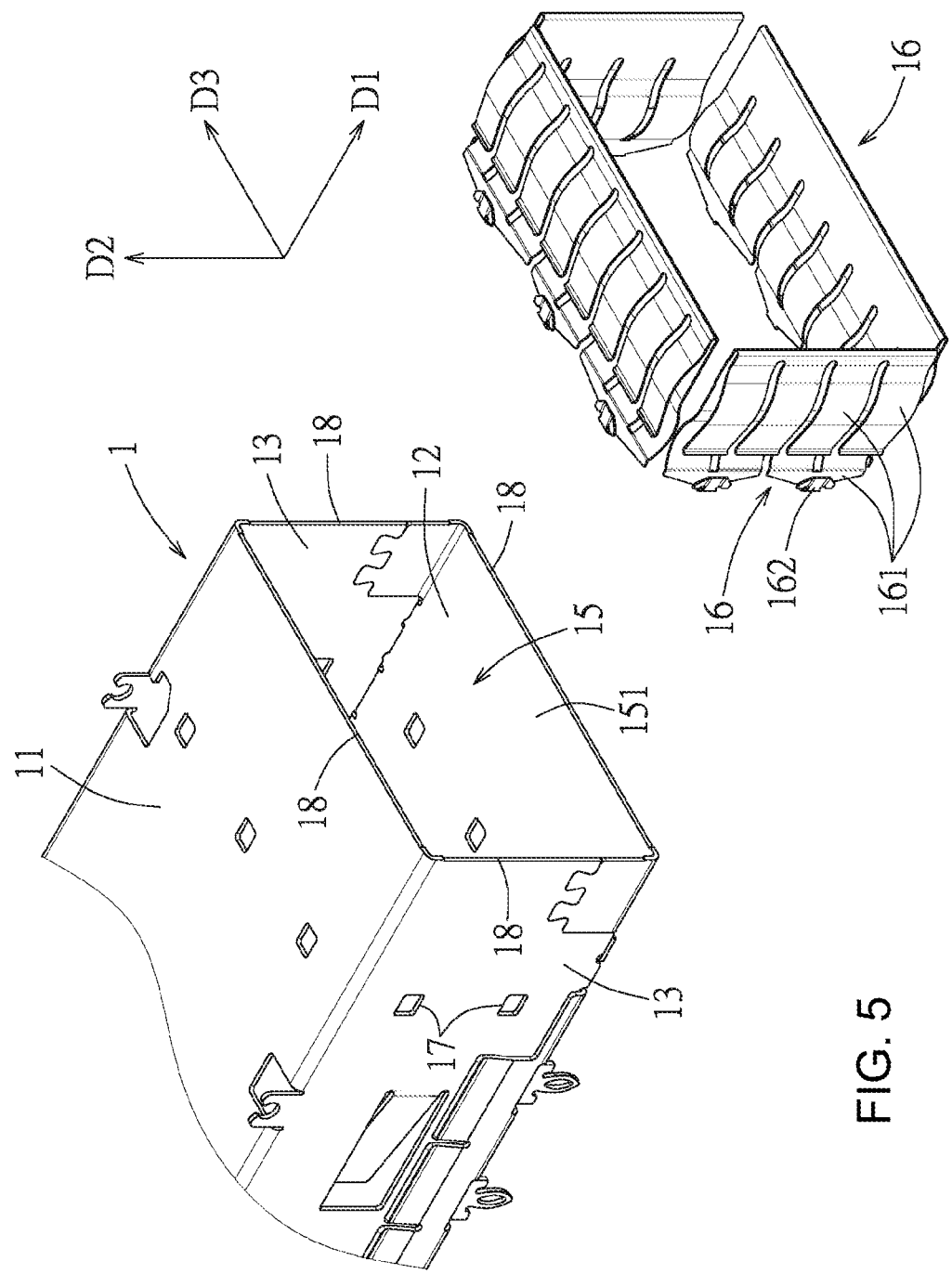
FIG. 5 is a partially enlarged perspective exploded view on a basis of FIG. 3.
Figure 6:
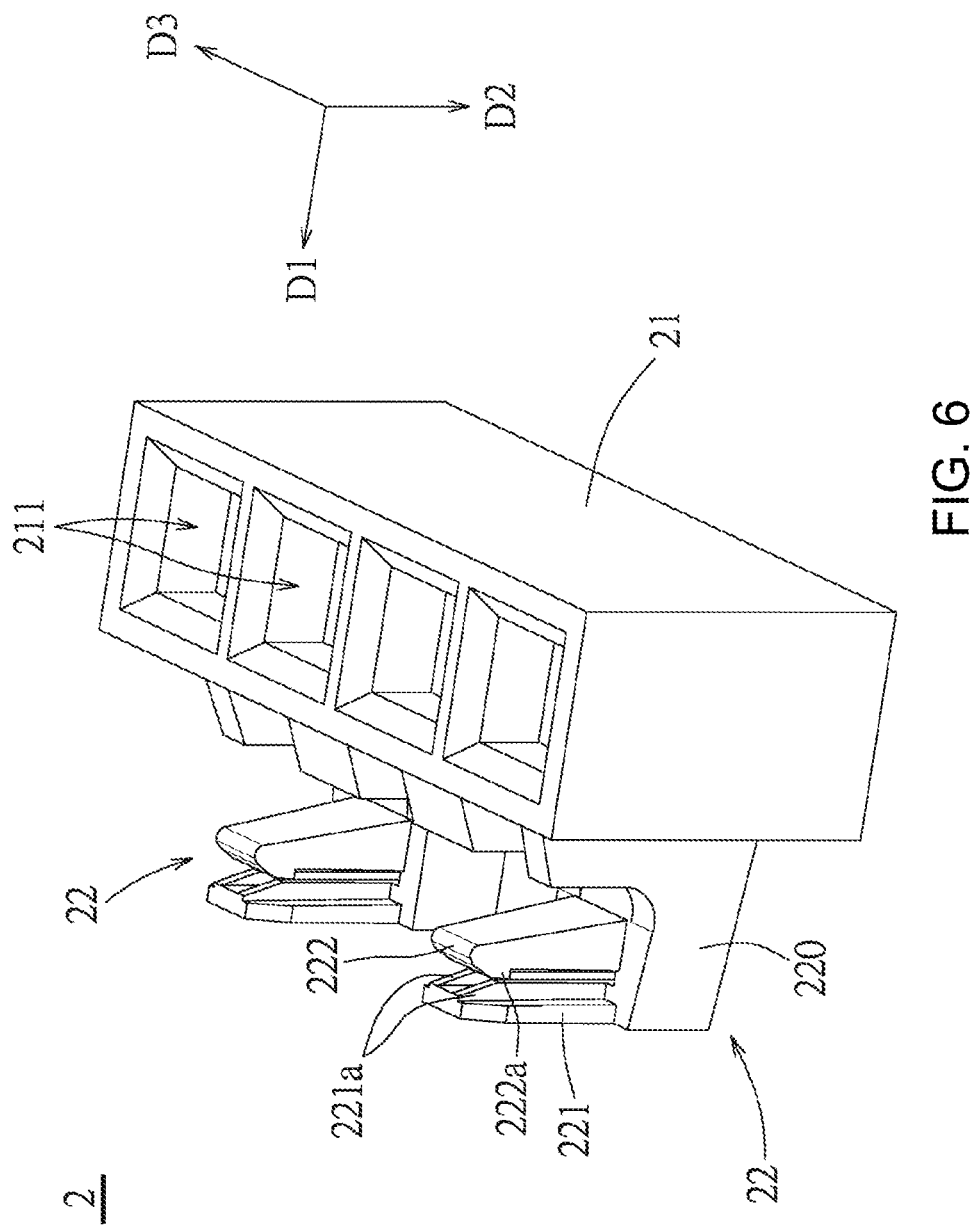
FIG. 6 is a perspective view of a holding member of the embodiment.
Figure 7:
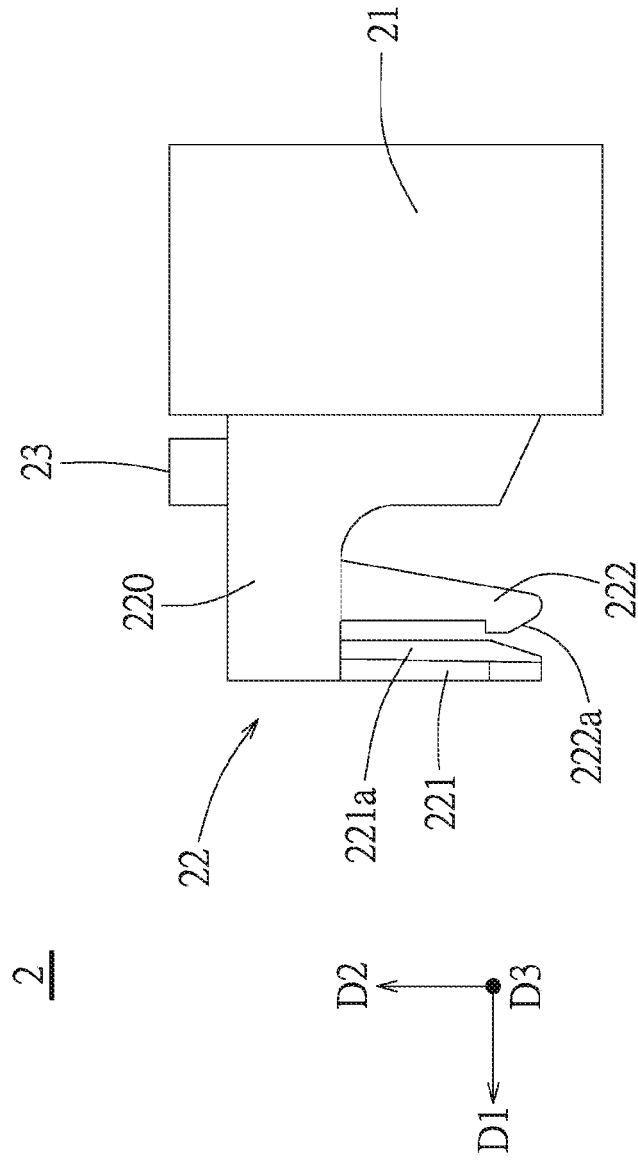
FIG. 7 is a side view of the holding member of the embodiment.
Figure 8:
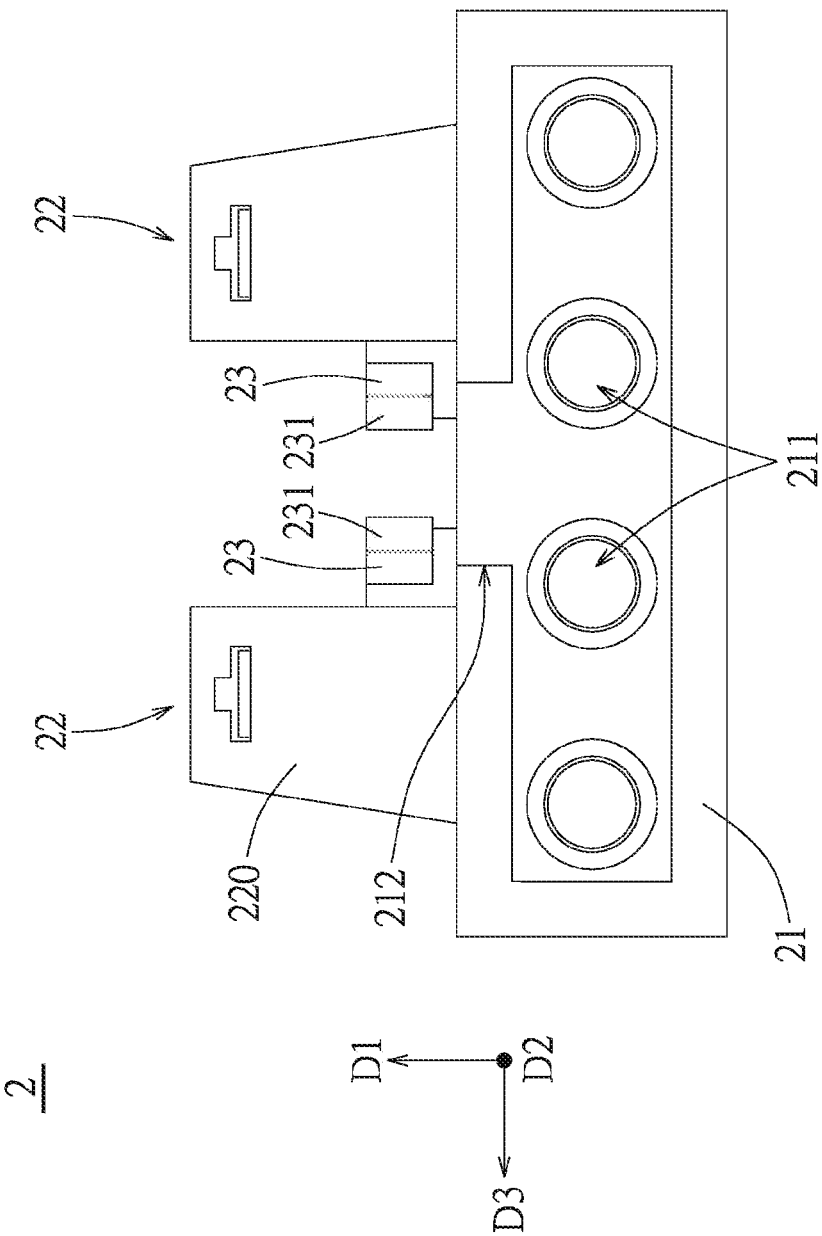
FIG. 8 is a top view of the holding member of the embodiment.

The shell 1, for example, is metal material, the shell 1 extends along a front-rear direction D1 and has a top wall 11, a bottom wall 12 which is spaced apart from and faces the top wall 11 along an up-down direction D2, two side walls 13 which are spaced apart from and face each other along a left-right direction D3 and respectively connected to two sides of the top wall 11 and the bottom wall 12, a rear wall 14 which is positioned at a rear end of the shell 1 and connected to rear edges of the top wall 11 and two side walls 13 and a plurality of insertion legs 131 which extend downwardly from the two side walls 13 and are adapted to be fixed on a circuit board (not shown) and/or connected to a grounding trace. The shell 1 further has a receiving cavity 15 which is defined by the top wall 11, the bottom wall 12, the two side walls 13 and the rear wall 14 together and positioned inside, a front end insertion opening 151 which is positioned at a front end of the shell 1, communicated with the receiving cavity 15 and allows the mating device to insert, and a bottom opening 152 which is positioned behind the bottom wall 12 and communicated with the receiving cavity 15. A receptacle connector (not shown) is provided to a rear segment of the receiving cavity 15, specifically, the receptacle connector is provided to the circuit board, and the receptacle connector is provided to the receiving cavity 15 via the bottom opening 152 so that the receptacle connector is covered by the shell 1. When the mating device is inserted into the receiving cavity 15 of the shell 1 from the front end insertion opening 151, a mating portion (not shown) of the mating device is inserted into the receptacle connector positioned in the receiving cavity 15 to mate with the receptacle connector. In combination with referring to FIG. 5, in addition, the shell 1 further has a plurality of grounding members 16 which are provided at the front end insertion opening 151, the grounding member 16 has a plurality of elastic fingers 161 which extend rearwardly from a position at the front end insertion opening 151 and are distributed at an outer side of the shell 1 and an inner side of the shell 1, the elastic finger 161 of the plurality of elastic fingers 161 which is positioned at the outer side of the shell 1 is used to contact a case (not shown), the elastic finger 161 of the plurality of elastic fingers 161 which is positioned at the inner side of the shell 1 is used to contact the mating device. The elastic finger 161 of the plurality of elastic fingers 161 which is positioned at the inner side of the shell 1 is formed with a reverse hook tab 162 at a tip of the elastic finger 161, the reverse hook tab 162 bends toward the shell 1 and extends forwardly, the shell 1 is formed with latching holes 17, the latching hole 17 penetrates the shell 1 and allows the reverse hook tab 162 of the elastic finger 161 to pass through and latch therewith, and a plurality of receiving recessed portions 18 are rearwardly formed at the front end insertion opening 151 of the shell 1 to correspondingly receive front ends of the plurality of grounding members 16, positioning of the plurality of grounding members 16 can be further enhanced by the plurality of receiving recessed portions 18, so as to prevent the plurality of grounding members 16 from displacing or sliding under an external force.

Referring to FIG. 2 to FIG. 4 and FIG. 6 to FIG. 7, the rear wall 14 is formed with two first clip structures 141 arranged along the left-right direction D3, each first clip structure 141 has a sheet body 141a formed by rearwardly stamping the rear wall 14, a clip hole 141b is defined between the sheet body 141a of each first clip structure 141 and the rear wall 14 and penetrates along the up-down direction D2. The holding member 2 has a holding body 21 which extends along the left-right direction D3 and two second clip structures 22 which are integrally formed forwardly from a front surface of the holding body 21 and respectively correspondingly cooperate with the two first clip structures 141, each second clip structure 22 has an extension arm 220 which extends forwardly from the front surface of the holding body 21, a first arm 221 which extends downwardly from the extension arm 220 and inserts into the corresponding clip hole 141b of the first clip structure 141 and a second arm 222 which extends downwardly from the extension arm 220, is positioned behind the first arm 221 and clips the corresponding sheet body 141a of the first clip structure 141 together with the first arm 221. In the embodiment, the first arm 221 is inserted into the clip hole 141b with an interference fit, that is to say, the first arm 221 abuts against the sheet body 141a and the rear wall 14, which define the clip hole 141b, with an interference fit. In the embodiment, the first arm 221 has a planar surface which faces the rear wall 14, the planar surface is attached to an outer surface of the rear wall 14, thereby making engagement of the holding member 2 and the shell 1 tighter and firmer. By that the sheet body 141a of the first clip structure 141 and the first arm 221 and the second arm 222 of the second clip structure 22 correspondingly cooperate with each other, the holding member 2 is easily mounted to the rear wall 14 of the shell 1, and because the sheet body 141a is formed by rearwardly stamping the rear wall 14, an opened area at the first clip structure 141 of the rear wall 14 can be decreased, in turn leakage of Electromagnetic Interference (EMI) can be decreased. It is noted that, in some varied embodiments, the second clip structure 22 also may not have the second arm 222, and at this time the first arm 221 of the second clip structure 22 is inserted into the clip hole 141b with an interference fit; but in other varied embodiments, the first arm 221 of the second clip structure 22 also may be inserted into the clip hole 141b without an interference fit, and at this time the second arm 222 and the first arm 221 of the second clip structure 22 together clip the sheet body 141a of the first clip structure 141, so it should not be limited to the embodiment. In addition, the first clip structure 141 and the second clip structure 22 is not limed to two in number, but also may be one or three or more in number.

In the embodiment, the first arm 221 is formed with two protruding ribs 221a which extend rearwardly and abut against the sheet body 141a with an interference fit, the two protruding ribs 221a extend along the up-down direction D2 and are arranged side by side and spaced apart from each other in the left-right direction D3, but in other embodiments, the two protruding ribs 221a also may extend forwardly and abut against the rear wall 14 with an interference fit, and the protruding rib 221a also may be one or three or more in number, it should not be limited to the embodiment. In addition, protruding amounts of the two protruding ribs 221a at lower ends thereof gradually decrease, which can attain guiding function to allow that the first arm 221 can more easily be inserted into the clip hole 141b downwardly. And the second arm 222 has a stopping portion 222a which is positioned to a tip of the second arm 222 and is used to abut against a bottom edge of the sheet body 141a, the stopping portion 222a can further prevent the sheet body 141a of the first clip structure 141 moving out from between the first arm 221 and the second arm 222 of the second clip structure 22, so as to strengthen a holding force between the first clip structure 141 and the second clip structure 22.

Referring to FIG. 1 to FIG. 4 and FIG. 8, the light guiding member 3 has a plurality of light guiding pipes 31 which are arranged side by side along the left-right direction D3 and each are L-shaped and a plurality of connecting posts 32 which are connected between the plurality of light guiding pipes 31. Each light guiding pipe 31 has a light entering end 311 toward the down and a light exiting end 312 toward the front. The holding body 21 of the holding member 2 is formed with a plurality of holding holes 211 which are arranged side by side along the left-right direction D3 and each penetrate in the up-down direction, the light entering ends 311 of the plurality of light guiding pipes 31 respectively being inserted into the plurality of holding holes 211 of the holding body 21 of the holding member 2 from up to down, and a bottom portion of the holding body 21 around the plurality of holding holes 211 are further used to cover a plurality of light emitting elements (not shown) received in the circuit board, thereby avoiding light emitted out by the light emitting elements leaking, and making light emitted out by the light emitting element reliably enter into the light entering end 311 of the light guiding pipe 31 of the light guiding member 3. Furthermore, the light guiding member 3 further has a fixed post 33, the fixed post 33 is positioned to a center of one of the plurality of connecting posts 32 which is positioned at the light entering ends 311 of the plurality of light guiding pipes 31 and the fixed post 33 extends forwardly, the holding body 21 is further formed a recessed groove 212 which is opened at a top of the holding body 21 and correspondingly receives the fixed post 33, the holding member 2 further has two latching arms 23 which extend forwardly and upwardly at the front surface of the holding body 21 and are together used to limit the fixed post 33 in position with the recessed groove 212, each latching arm 23 has a latching protrusion 231 which is positioned to a tip of the latching arm 23 and is used to latch the fixed post 33, therefore the light guiding member 3 can be hold to the holding member 2.

Returning to refer to FIG. 1 to FIG. 4, in addition, the shell 1 further has two mounting tabs 132 which extend upwardly respectively from the two side walls 13 at positions adjacent to the front end insertion opening 151, the light guiding member 3 further has two mounting posts 34 which extend outwardly along the left-right direction D3 from two of the plurality of light guiding pipes 31 positioned to two sides of the plurality of light guiding pipes 31, the two mounting posts 34 are respectively mounted to the two mounting tabs 132, each mounting tab 132 has a mortise 132a opened upwardly, each mounting post 34 has a tenon 341 which is positioned to a tip of the mounting post 34 and jointed to the corresponding mortise 132a of the mounting tab 132. With the holding member 2 and cooperation of the two mounting tabs 132 and the two mounting posts 34, the light guiding member 3 can be stably hold to the shell 1.

In addition, in the embodiment, the shell 1 further has a plurality of ventilating holes 19 which are penetratingly formed to the top wall 11 and the rear wall 14, the plurality of ventilating holes 19 correspond to the receptacle connector in position, thereby enhancing ventilation to assist in heat dissipation of the receptacle connector. The plurality of ventilating holes 19 are honeycomb type ventilating holes, that is to say, the plurality of ventilating holes 19 each are regular hexagon, and the plurality of ventilating holes 19 are arranged so that adjacent ventilating holes 19 are arranged by side to side, thereby decreasing leakage of Electromagnetic Interference (EMI) under a precondition to assure heat dissipation.

In conclusion, in the present disclosure, the first clip structure 141 has the sheet body 141a which is integrally formed rearwardly by the rear wall 14, by that the sheet body 141a and the second clip structure 22 can correspondingly cooperate with each other, the holding member 2 is easily mounted to the rear wall 14 of the shell 1, and because the sheet body 141a is formed by stamping rearwardly the rear wall 14, the sheet body 141a can partially covers the opened area which is positioned at the first clip structure 141 of the rear wall 14 and directly faces the receiving cavity 15 of the shell 1, in turn leakage of Electromagnetic Interference (EMI) is decreased.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device, comprising:
   a shell having a front end insertion opening and a rear wall, the rear wall being formed with a first clip structure, the first clip structure having a sheet body which is integrally formed rearwardly by the rear wall, a clip hole being defined between the sheet body and the rear wall;
   a holding member having a holding body and a second clip structure which is integrally formed from the holding body and correspondingly cooperates with the first clip structure, the second clip structure having a first arm inserted into the clip hole with an interference fit; and
   a light guiding member having a plurality of light guiding pipes, each light guiding pipe having a light entering end and a light exiting end, the light entering ends of the plurality of the light guiding pipes being inserted into the holding body of the holding member.

2. The electrical connection device of claim 1, wherein the first arm is formed with at least one protruding rib which abuts against the sheet body or the rear wall with an interference fit.

3. The electrical connection device of claim 1, wherein the second clip structure further has a second arm which clips the sheet body together with the first arm.

4. The electrical connection device of claim 3, wherein the second arm has a stopping portion which is used to abut against an edge of the sheet body.

5. The electrical connection device of claim 1, wherein the first arm has a planar surface which faces the rear wall, the planar surface being attached to an outer surface of the rear wall.

6. The electrical connection device of claim 1, wherein
   the light guiding member has a plurality of connecting posts which are connected between the plurality of the light guiding pipes and a fixed post which is positioned to a center of one of the plurality of connecting posts positioned at the light entering ends of the plurality of the light guiding pipes and extends forwardly,
   the holding body is formed with a recessed groove which is opened at a top of the holding body and correspondingly receives the fixed post.

7. The electrical connection device of claim 6, wherein
   the holding member further has two latching arms which limit the fixed post in position,
   each latching arm has a latching protrusion which is used to latch the fixed post.

8. The electrical connection device of claim 1, wherein the sheet body is formed by rearwardly stamping the rear wall.

9. The electrical connection device of claim 1, wherein the shell further has a grounding member provided at the front end insertion opening, the grounding member has a plurality of elastic fingers which rearwardly extend from a position at the front end insertion opening, a receiving recessed portion is rearwardly formed at the front end insertion opening of the shell and correspondingly receives a front end of the grounding member.

10. An electrical connection device, comprising:
    a shell having a front end insertion opening and a rear wall, the rear wall being formed with a first clip structure, the first clip structure having a sheet body which is integrally formed rearwardly by the rear wall, a clip hole being defined between the sheet body and the rear wall;
    a holding member having a holding body and a second clip structure which is integrally formed from the holding body and correspondingly cooperates with the first clip structure, the second clip structure having a first arm inserted into the clip hole and a second arm which clips the sheet body together with the first arm; and
    a light guiding member having a plurality of light guiding pipes, each light guiding pipe having a light entering end and a light exiting end, the light entering ends of the plurality of the light guiding pipes being inserted into the holding body of the holding member.

11. The electrical connection device of claim 10, wherein the second arm has a stopping portion which is used to abut against an edge of the sheet body.

12. The electrical connection device of claim 10, wherein the first arm abuts against the sheet body and the rear wall, which define the clip hole, with an interference fit.

13. The electrical connection device of claim 12, wherein the first arm is formed with at least one protruding rib which abuts against the sheet body or the rear wall with an interference fit.

14. The electrical connection device of claim 10, wherein the first arm has a planar surface which faces the rear wall, the planar surface is attached to an outer surface of the rear wall.

15. The electrical connection device of claim 10, wherein
    the light guiding member has a plurality of connecting posts which are connected between the plurality of the light guiding pipes and a fixed post which is positioned to a center of one of the plurality of connecting posts positioned at the light entering ends of the plurality of the light guiding pipes and extends forwardly,
    the holding body is formed with a recessed groove which is opened at a top of the holding body and correspondingly receives the fixed post.

16. The electrical connection device of claim 15, wherein
    the holding member further has two latching arms which limit the fixed post in position,
    each latching arm has a latching protrusion which is used to latch the fixed post.

17. The electrical connection device of claim 10, wherein the sheet body is formed by rearwardly stamping the rear wall.

18. The electrical connection device of claim 10, wherein the shell further has a grounding member provided at the front end insertion opening, the grounding member has a plurality of elastic fingers which rearwardly extend from a position at the front end insertion opening, a receiving recessed portion being rearwardly formed at the front end insertion opening of the shell and correspondingly receives a front end of the grounding member.

* * * * *